May 24, 1960     C. F. MARTIN ET AL     2,937,894
ROD WIPER DEVICE
Filed April 16, 1957
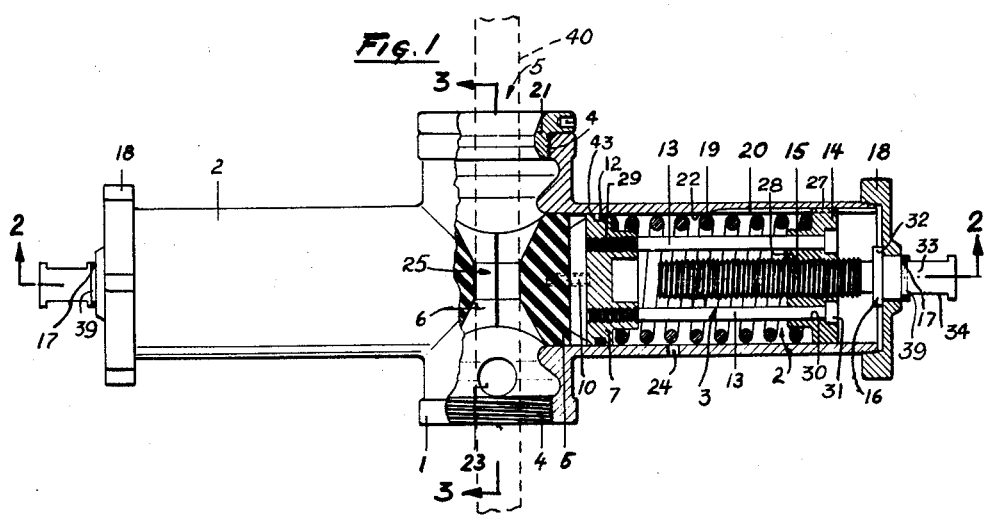
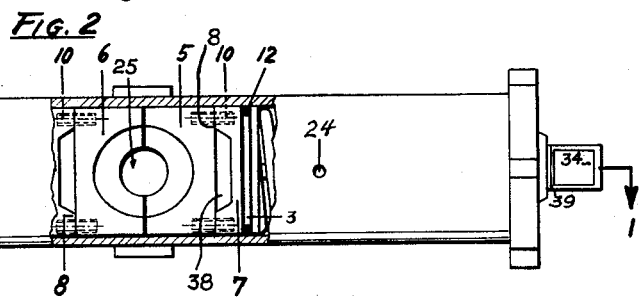
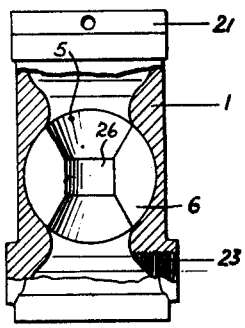
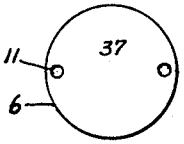
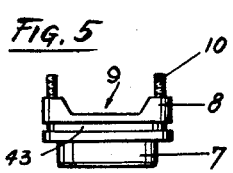
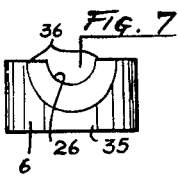
INVENTORS
Claude F. Martin
Carl E. Olsen
BY Joseph Arved Peterson
Cushman, Darby & Cushman
ATTORNEYS

United States Patent Office 2,937,894
Patented May 24, 1960

2,937,894

ROD WIPER DEVICE

Claude F. Martin, P.O. Box 362, Laurel, Miss., and Carl E. Olsen and Joseph Arvid Peterson, both of P.O. Box 1221, Houston 1, Tex.

Filed Apr. 16, 1957, Ser. No. 653,156

5 Claims. (Cl. 286—16.2)

This invention relates to improvements in rod wipers and more particularly to a rod wiper device which is adapted to maintain a seal while some member, such as a sucker rod or other device, is moved longitudinally in the well bore.

The primary object of the present invention is the provision of a rod wiper device which will maintain a seal about a member movable in a well bore while permitting passage of couplings or other enlargements upon the member being moved.

Another important object of this invention is the provision of a rod wiper device to be installed on a well casing or tubing for the purpose of controlling and preventing the escape of fluid under pressure from the well. The invention embodies novel means for completely closing the space between the wiper housing and the sucker rod or other device whereby the escape of fluid from the well, through said space, may be entirely prevented.

Another object of the invention is to provide a resilient sealing body wherein a pressure applied thereto will be distributed uniformly throughout the member to obtain a uniform sealing action.

Still another object of the invention is to provide a resilient sealing member which will be deformed by engagement against the member with which a seal is being effected so as to cause displacement of the sealing member.

Another object of the present invention is the provision of a rod wiper device which may be used to strip and clean oil from a sucker rod or other device while passing through the wiper housing.

An important object of the present invention is to provide a rod wiper device which is arranged to permit the passage of a sucker rod or pipe coupling without losing pressure, and a positively actuated blowout preventer for providing a positive closure to withstand oil or gas pressures and prevent a blowout of these fluids.

Still another object of the invention resides in the feature that the resilient members may be easily replaced without dismounting the rod wiper housing from the well casing or tubing.

Still further objects and the entire scope of the present invention will become apparent from the detailed description given hereinafter. It should be understood, however, that the detailed and specific examples, while indicating the preferred embodiments of the invention, are given by way of illustration only, since various changes and modifications within the spirit and scope of the invention will become apparent as the description herein progresses.

Reference is made to the accompanying drawings wherein:

Figure 1 is a vertical sectional view partially in elevation, taken along the line 1—1 of Figure 2, illustrating the details of construction of the present invention;

Figure 2 is a horizontal sectional view partially in elevation, taken on the line 2—2 of Figure 1;

Figure 3 is a cross-sectional view taken along the line 3—3 of Figure 1;

Figure 4 is a front view of a plunger constructed in accordance with the present invention;

Figure 5 is a top view of the plunger showing a novel recessed portion;

Figure 6 is a rear view of a resilient wiper member, and,

Figure 7 is a top view of the resilient wiper member constructed in accordance with the present invention.

The rod wiping device embodying the present invention is illustrated in Figure 1 and comprises generally, a housing 1, oppositely arranged and laterally extending cylinders 2, an axially adjustable assembly 3, a sucker rod passageway 5, and resilient wiper members 6.

The housing 1 of the improved rod wiper device defines a passageway 5 for receiving a sucker rod or pipe line 40 shown in dotted line and is provided at both ends with internally threaded portions 4; the lower threaded portion being arranged to receive the standard well casing or tubing (not shown), while the upper threaded portion carries an upwardly flared, removable insert 21, made of bronze or similar material for both minimizing sparking hazard and to prevent damage to the sucker rods and housing threads 4. The insert 21 may be easily removed and additional equipment coupled with the upper threaded portion 4 without the necessity of removing the entire rod wiper device. Moreover, a threaded opening 23 is provided in the lower portion of the housing 1 for connecting a suitable drain line.

The oppositely disposed cylinders 2, extending laterally from the housing 1, have a uniform inner bore 22 with an axially extending key slot 20 formed therein. The complementary resilient wiper members 6 are slidably disposed in the cylinders 2 and radially unite to form a variable constrictive throat 25 across the sucker rod passageway 5. The resilient members 6 may be made from a neoprene compound or other suitable material with an outside peripheral diameter slightly smaller than the inside bore 22 of cylinders 2. Each of the resilient members 6 includes a body portion 35 having a pair of outwardly extending complementary protuberances 36 projecting forwardly from the body to define a semi-conical opening 26. When the resilient members 6 are advanced axially, the opposed protuberances 36 move radially into interfitting relation and form a substantially circular constrictive throat 25 across the sucker rod passageway 5.

Cooperating with the resilient members 6, is an axially adjustable assembly generally indicated by the numeral 3 which is slidably mounted in the cylinders 2. The adjustable assembly 3 comprises generally a metallic plunger member 7 registering with the resilient wiper member 6, a guide member 14, and a pair of axially extending guide rods 13. The assembly 3 forms a unitary structure which may be easily removed from the cylinders 2 for simplifying replacement of the resilient wiper members and subsequently reinstallment for normal operation. The plunger 7 has an outside peripheral diameter slightly less than the inside bore 22 of the cylinders 2. A circumferential groove 43 is formed in the plunger 7 for receiving a yieldable O-ring 12. The O-ring 12 is arranged to expand upon movement of the plunger 7 into sealing engagement with the corresponding bore 22 surrounding the plunger 7 to prevent pressure leakage therebetween. Two serrated or threaded pins 10 are provided for interlocking the plunger member 7 with the resilient wiper members 6. The resilient members 6 are installed by pressing the pins 10 into the holes 11, formed on the rear surface 37 of the resilient wiper members. This serves to retain the resilient wiper members in proper alignment with the plunger and avoids any relative rotation between these elements. The plunger 7 has a forward face 8 registering with the rear surface 37 of said resilient members. A recessed portion 9 in the plunger face 8 extends parallel to the sucker rod passageway 5 defining a void 38 between the recessed portion 9 and the rear surface 37 of the resilient members as best shown in Figure 2. This void permits the rear surface 37 of the resilient member 6 to freely deform upon the application of pressure against said resilient member. Accordingly, irregularly shaped producing equipment and rod couplings will readily pass through the variable constrictive throat 25 without the necessity of retracting the resilient wiper members 6. Moreover, when an irregularly contoured or enlarged member 40 is passed through the throat 25, the rear surface 37 of the resilient wiper members 6 shown in Figure 6 will deform under pressure and enter the recessed portion 9 of the piston 7, causing the outwardly extending protuberances 36 to flex laterally and completely encompass the enlarged member to form a resilient constrictive seal.

The guide member 14, with an outside diameter also slightly smaller than the cylinder bore 22, has a raised key 27 on its outer periphery mounted in sliding engagement with the key slot 20 for preventing the guide member from rotating. A threaded adjusting portion 28 in the center of the guide member 14 threadedly engages a feed or adjusting screw 15. A pair of axially extending guide rods 13, each having one end detachably secured to the rear of the plunger member at 29, extend through the openings 30 formed in the guide member 14 and terminate in an abutment 31, shown as a socket head in Figure 1. It will be noted that the guide rods 13 serve to limit the axial movement of the guide member 14 in one direction while also preventing the plunger member 7 from rotating relative to said guide member. A compressed helical spring 19 is shown resiliently separating the guide member 14 from the plunger member 7.

The outer ends of the cylinders 2 have external threads for detachably securing a cap member 18 thereto. The feed or adjusting screw 15 is rotatably mounted in the cap member 18. The adjusting screw 15 is retained in position by means of both a shoulder 32 which exerts axial pressure on the internal face of the cap member 18 and a snap ring retainer 17 mounted in a groove 39 formed in the protruding end 33 of the adjusting screw adjacent the external face of the cap. The protruding end 33 of the adjusting screw 15 is shown with flats 34 for receiving an adjustment wrench. Moreover, the cylinders 2 are provided with relief holes 24 to prevent air lock behind the plunger member 7 and serving to drain away any accumulated fluid escaping into the cylinders.

In operation, the resilient wiper members 6 may be retracted by rotating the feed screw 15 which in turn reduces compression on the spring member 19, and finally withdraws the wiper members entirely clear of the passageway 5 allowing the sucker rods to freely pass through the housing. Accordingly, the pressure on the resilient members 6 may be increased by reversing the turning movement on the feed screw 15 and advancing the resilient wiper member into operative position.

It will be noted that one of the important features of this invention resides in the fact that the spring resiliency may be overcome to obtain a positive mechanical connection between the plunger member 7 and the guide member 14 for counteracting the high pressures developed during a blowout. This is accomplished when the helical coils of the spring 19 are rigidly compressed into direct contact with adjacent coils by tightening the feed screw 15 which in turn axially moves the guide member 14 towards the plunger member 7. Accordingly, the normal resilient wiping action would be overcome and the assembly 3 would rigidly advance the wiper member 6 to prevent a blowout.

Occasionally the resilient members 6 might have to be replaced and for this reason the handling of the axially adjustable assembly 3 would be completely safe since the spring 19 is retained between the plunger member 7 and a guide member 14 by means of the guide rods 13. Accordingly, the cap member 18 could be safely removed since it would be free from any axial load.

It is also to be understood that although a preferred embodiment of the invention has been shown in the drawings and described with considerable particularity in the foregoing specification, the invention is not limited to specific details of construction shown and described, but includes all modifications coming within the scope of the appended claims and their equivalents.

We claim:

1. A well-rod wiping and blow-out preventing device comprising in combination, a housing having a well-rod passageway extending therethrough, a plurality of radially disposed cylinders each having a forward end opening into the housing passageway, an axially compressible spring assembly mounted within each cylinder for longitudinal movement between a forward operating position and a retracted inactive position rearwardly thereof, a resilient wiper member connected to the forward end of said spring assembly which is arranged to enter said passageway and radially unite with the other wiper members to form a constrictive throat across the passageway when said spring assembly is advanced to operating position, and advancing means operatively connected to each cylinder for sequentially advancing said spring assembly axially to a first operating position wherein the spring assembly exercises a biasing force on an associated wiper member and then to a second operating position wherein said spring assembly is compressed to form a rigid structure for preventing the passage of fluid through said passageway.

2. A well-rod wiping and blow-out preventing device comprising a combination, a housing having a well-rod passageway extending therethrough, a pair of oppositely-arranged cylinders extending laterally from said housing each having a forward end opening into said passageway, an axially compressible spring assembly mounted within each cylinder for longitudinal reciprocating movement between a forward operating position and a retracted inactive position rearwardly thereof, said spring assembly including a movable plunger having a resilient wiper member connected to the forward end thereof which is arranged to enter said passageway when said spring assembly is advanced to operating position, a non-rotatable guide member having a threaded adjusting portion, said guide member being axially movable relative to said plunger, guide means for preventing said plunger from rotating relative to said guide member, spring means resiliently separating said plunger from said guide member, a feed screw for axially advancing said assembly and adjustably compressing said spring means, and means mounted on each cylinder for rotatably supporting said feed screw in a fixed longitudinal position relative to said cylinder, said feed screw threadably engaging the threaded portion of said guide member for axially advancing said assembly and adjustably compressing said spring means, said guide member operating to compress said spring means to a rigid condition when said spring assembly is in operating position to prevent the blow-out of fluid through said housing.

3. The device as set forth in claim 2 wherein said guide means includes a pair of axially extending guide rods each having one end detachably secured to the rear of said plunger, said guide rods extending through suitable openings formed in said guide member and terminating in an abutment for limiting the axial movement of said guide member in one direction.

4. The structure as defined in claim 2 wherein said plunger includes a recessed portion formed along the face thereof adjacent the rear surface of said wiper member and extending parallel to said passageway for allowing the rear surface of said wiper member to freely deform upon application of pressure.

5. The device as set forth in claim 4 wherein each of said resilient members includes a body portion having a pair of outwardly extending complementary protuberances projecting forwardly from said body so that the opposed protuberances move into interfitting relation and form a substantially circular opening within said passageway, said protuberances flex laterally when the rear surface of said resilient member enters said recessed portion to form a resilient constrictive seal.

References Cited in the file of this patent

UNITED STATES PATENTS

| Re. 18,948 | McNeff et al. | Sept. 12, 1933 |
| 1,782,851 | Hoffman et al. | Nov. 25, 1930 |
| 2,264,600 | Webb | Dec. 2, 1941 |
| 2,642,942 | Reynolds | June 23, 1953 |